United States Patent [19]

Siczek et al.

[11] Patent Number: 4,673,297
[45] Date of Patent: Jun. 16, 1987

[54] ORBITAL SHAKER

[75] Inventors: Roman W. Siczek, Chicago; William W. Stanley, Batavia; Glenn E. Mikyska, Naperville, all of Ill.

[73] Assignee: Cymatics, Inc., Naperville, Ill.

[21] Appl. No.: 632,574

[22] Filed: Jul. 19, 1984

[51] Int. Cl.[4] .............................................. B01F 11/00
[52] U.S. Cl. ................................................... 366/208
[58] Field of Search .............. 366/208, 209, 212, 213, 366/218, 219, 237, 240, 128, 109, 110, 210, 211

[56] References Cited

U.S. PATENT DOCUMENTS

| | | | |
|---|---|---|---|
| 2,255,799 | 9/1941 | Meinzer | 366/128 |
| 2,500,293 | 3/1950 | O'Connor | 366/128 |
| 2,756,973 | 7/1956 | Dostatni | 366/128 |
| 2,793,010 | 5/1957 | Menken . | |
| 3,173,664 | 3/1965 | Isaacson et al. . | |
| 3,297,304 | 1/1967 | Wahl | 366/109 |
| 3,310,292 | 3/1967 | Moore . | |
| 3,871,623 | 3/1975 | Boenisch . | |
| 4,061,315 | 12/1977 | Eitzen | 366/208 |
| 4,109,319 | 8/1978 | Brandt . | |
| 4,118,801 | 10/1978 | Kraft et al. . | |
| 4,202,634 | 5/1980 | Kraft et al. . | |
| 4,305,668 | 12/1981 | Bilbrey | 366/208 |
| 4,403,867 | 9/1983 | Duke . | |

Primary Examiner—Robert W. Jenkins
Attorney, Agent, or Firm—Fitch, Even, Tabin & Flannery

[57] ABSTRACT

An orbital shaker apparatus which has a tray for cyclic motion is flexibly suspended from a frame which is flexibly suspended from a plurality of stationary supports. The flexible suspension constrains the tray to move only translationally along one axis with respect to the frame and constrains the frame to move only translationally along one axis perpendicular to the tray movement axis. A microprocessor is used for receiving operator input to set the speed and duration of the cyclic motion. Embodied in the microprocessor is a closed loop speed control which measures the actual speed of the cyclic movement with an interrupt routine which calculates the duration between the pulses of an optoelectric speed sensor. The actual speed is compared to the set speed and a digital "bang-bang" control signal is generated to regulate motor velocity from the difference between the two speeds.

16 Claims, 13 Drawing Figures

ORBITAL SHAKER

The present invention pertains generally to an agitation apparatus and is more specifically directed to such agitation apparatus that are used in a laboratory environment to agitate an assay with a generally orbital motion.

In certain laboratory applications, it is desirable to move beakers, test tubes, or other containers which contain a biological assay in an orbital path with a uniform motion. This uniform motion should also include a uniform speed so as to enable comparisons of the results of the mixtures achieved for different runs of the apparatus. In other words, it is desirable to enable a first batch of assays to be moved in an identical motion for an identical number of cycles as that of a second group of assays. The advantage of this uniformity is that it contributes to the elimination of another variable in the test and thus a source of error in a clinical assay. Therefore, precision and reproducibility are key goals in these clinical mixing apparatus.

In the past, apparatus for achieving such orbital motion for the mixing and agitation of clinical assays has not provided particularly good reliability in terms of the repetition of speed and number of cycles. Further, known apparatus for providing this type of motion have typically been quite noisy, which is undesirable in a laboratory atmosphere. Along with the problems of reliability, known orbital mixers have not been very precise. The control of these orbital shakers has generally been dependent upon analog circuitry and, accordingly, variations in the number of cycles and control of the time are very difficult to predict because of the variation in the precision of the control circuitry. One area of particular difficulty has been the precision with which the orbital velocity can be controlled because of the analog type circuitry used to drive the apparatus.

One of the uses of such an apparatus has been to move cultures growing in beakers in an orbital motion, such that their interiors will provide an environment for the controlled growth of the cultures. This use requires that the motion imparted to the culture containers be relatively gentle and requires the paths of the containers be substantially circular, so as to produce a uniform agitation. The uniformity of the agitation and control of the velocity are important to maintain the similar growth rates of the cultures from one batch to another and from one container to another in the same batch.

Although many of the uses for orbital shakers are in the medical area, other uses are common for these devices and exist throughout areas where agitation is necessary.

SUMMARY OF THE INVENTION

The invention provides an improved orbital shaker apparatus which is quiet in operation, and reliably produces an orbital or cyclic motion at a set speed and for a predetermined amount of time.

The apparatus comprises a movable tray for supporting articles which are to be agitated such as clinical assays in beakers, flasks, test tubes or the like. The tray is supported by a suspension system which provides support for the loading of the tray with an assay while permitting a cyclic movement in the plane of the tray without undue resistance. The suspension system constrains the tray to move in translational modes only so that there is no rotation of the plane of the tray and every point on the tray subscribes substantially the same path. The translational constraints are provided by a suspension system which suspends the tray from a frame with flexible supports. The flexible supports are constrained so as to be flexible only in one dimension, and permit movement of the tray only along one axis with a respect to the frame. The frame is suspended by flexible supports from a plurality of stationary stands so that it is constrained to translational movement along an axis perpendicular to the tray movement axis. The combination of the translational movements of the tray and the frame allow the tray to be moved in any number of precise cyclic motions. Because all the movement is produced by the bending of the flexible supports, there are no mechanical surfaces to rub together to create noise, friction, or tolerance errors.

An advantageous direct drive control is used to impart the cyclic motion to the tray. In the preferred embodiment, a motor has its shaft mounted substantially perpendicular to the plane of the tray. The motor is coupled to the tray by a drive pin which is set eccentric to the shaft on a counterweight to produce a circular orbit around the shaft and thereby a circular orbit of each point on the plane of the tray.

A microprocessor based controller is provided to precisely control the speed of the cyclic motion and the duration of the motion. The controller receives a speed set command and a time set command from an operator through an input port and converts these commands into digital values which may be stored in the memory of the microprocessor. The microprocessor includes an interrupt input which receives pulses from an optoelectric sensor at a frequency determined by the actual speed of the motor. The microprocessor calculates the actual speed of the motor by counting the clock pulses during the intervals between pulses. The actual speed of the motor is compared to the stored speed set value and a digital drive signal of one level is output from an output port of the microprocessor if the set speed is less than the actual speed and a second level is output if the set speed is greater than the actual speed. The drive signal turns the motor fully on with one level and fully off with the second level to provide a digital speed control.

The microprocessor in response to a start signal initiates the speed control and stores a reference from a real time time clock at which the process was started. In addition, the preset duration is compared against the real time clock and the starting value to determine when the requested duration has elapsed. The microprocessor terminates the speed control and stops the apparatus at the end of the duration or when a stop signal is generated.

These and other objects, features and aspects of the invention will be more fully understood and described when a reading of the detailed description is undertaken in conjunction with the appended drawings wherein:

Appendix A is a listing of software forming the speed control.

DETAILED DESCRIPTION OF THE PREFERRED EMBODIMENT

Figure 1:
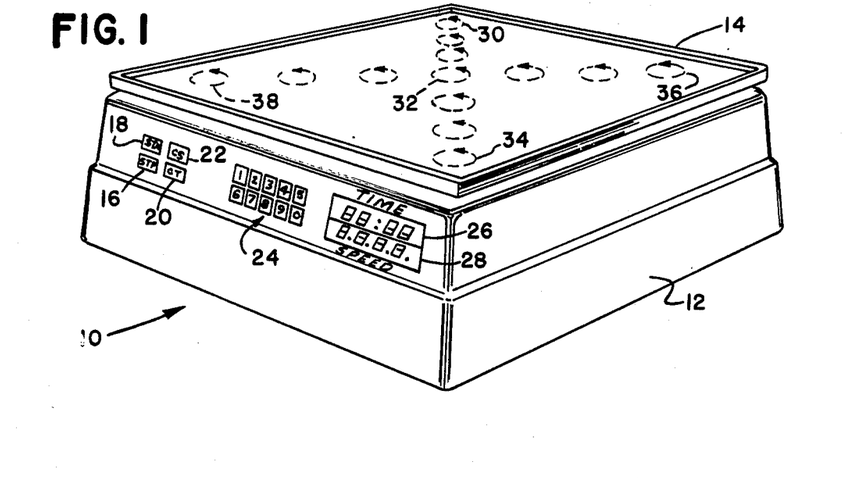
FIG. 1 is a pictorial perspective view of an orbital shaker constructed in accordance with the invention.

With respect now to FIG. 1, there is shown an orbital shaker 10 constructed in accordance with the invention. The orbital shaker 10 comprises a base 12 providing operator inputs including control keys 16-20 and keypad 24. In addition, a display means comprising a time display 26 and a speed display 28 are provided. The orbital shaker 10 imparts an exact orbital motion to specimens placed on a tray 14 which is moved in a prescribed cyclic motion at a particular speed and for a predetermined amount of time. One important object of the invention is to impart the same motion at each of the corners 30, 34, 36 and 38, of the tray 14 as that imparted in the middle of the tray 32. This is accomplished by preventing the plane of the tray 14 from rotating and containing it to move in its translational modes. In this manner, uniform agitation for the many assays contained on the tray will be assured.

The motion which will be described with respect to the preferred embodiment will be an orbital motion of a circular nature. However, it should be pointed out that orbital motions which are not circular, such as elliptical, oval or the like, or even more compound shapes are within the scope of the invention. Further, it will be seen that in addition to orbital motion, single axis or plural axis translational movements are available from the apparatus and depend only upon the driving means. All these motions can be produced by the apparatus with precision and without noise as will be more fully explained hereinafter.

The operator control keys comprise the four pushbutton switches, 16, 18, 20, and 22. The pushbutton 18 is the start button and, assuming all conditions are clear for initiating motion of the tray 14, pressing this button will initiate the agitation operation. The stop button, control key 16, will cause a termination of the motion of the tray 14 prior to a timeout. In general, the operator controls are used to produce input signals which will cause the apparatus to cyclically move the tray at a set velocity for a predetermined period of time. The velocity which the operator wishes to produce for the motion is input by pressing the change-speed key 22 and then entering a three digit numerical value with the 0-9 keys of keyboard 24. This velocity set point is then displayed in the digits of the speed display 28. The time period for the agitation at the constant velocity is input to the apparatus by pressing the change-time button 20 and then entering a numerical value from the keyboard 24. This time period is entered into the time display 26 and indicates the amount of time the material in the tray should be agitated for a particular experiment.

By operating special combinations of the keys, special functional operations are available. Pressing the change-speed key while simultaneously holding in the 1 or 2 key causes the speed of the apparatus to ramp up or ramp down, respectively, while the apparatus is running. Pressing the change-time key while simultaneously holding in the 1 or 2 key causes the time display 26 to be set for hours and minutes in the first instance and minutes and seconds in the second.

Figure 2:
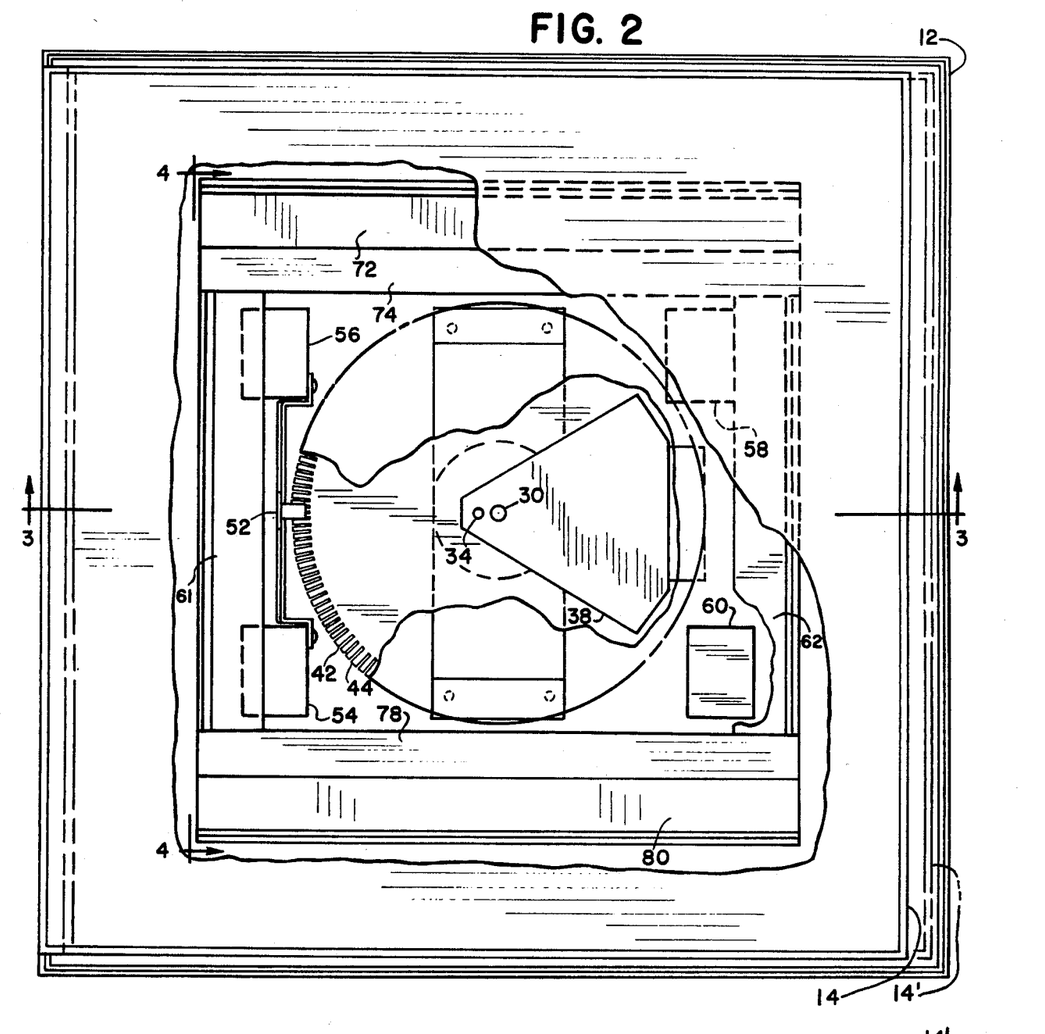
FIG. 2 is a fragmented top view of the orbital shaker illustrated in FIG. 1.
Figure 3:
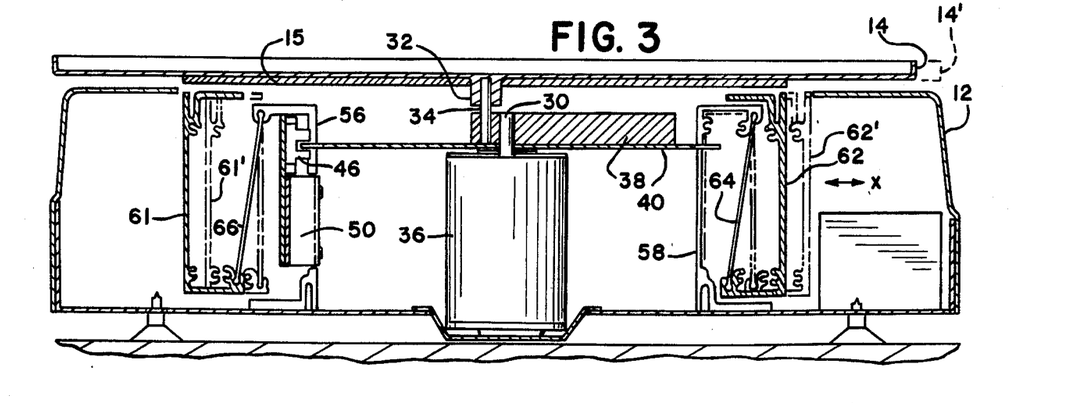
FIG. 3 is a cross sectional side view of the direct drive mechanism and suspension system of the orbital shaker illustrated in FIG. 1.
Figure 4:
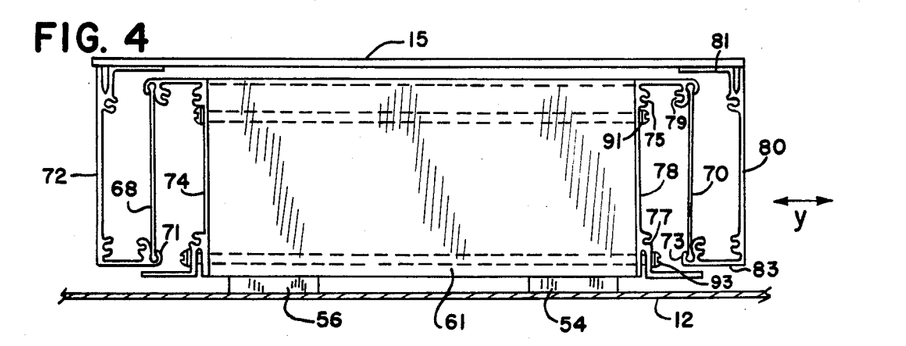
FIG. 4 is a partially cross sectional front view of the suspension system of the orbital shaker illustrated in FIG. 1.

With respect now to FIGS. 2, 3 and 4, the generation of the motion for a circular embodiment will be more fully explained. The motion of the tray 14 is produced by a direct drive, including a DC motor 36 having a drive shaft 30 substantially perpendicular to the plane of the tray 14. The drive shaft 30 fits into a bore of a counterweight 38 which has an offset or eccentric drive pin 34 substantially parallel to the drive shaft 30. Rotation of the drive shaft 30 by the motor produces an orbit (in the embodiment circular) of the drive pin 34 about the motor. The drive pin 34 is coupled through a support plate 15 by means of a bushing 32 on the tray 14. This direct drive orbiting of the vertically oriented axis of the motor and the counterweight produce a smooth continuous orbital motion for the tray 14.

The counterweight 38 is generally about one-half of the maximum load that the tray 14 is designed to hold and thus will substantially balance many loads. The counterweight 38 helps center the rotational mass over the motor axis. The counterweight 38 is to overcome the inertia of the load placed on the tray, but does not have to overcome the actual weight of the load because the tray 14 is supported by the backing plate 15 which is mounted on suspension means which bear the weight of the load. As will be more fully explained hereinafter, the direct drive motor 36 can be controlled with a closed loop feedback control to produce a precise speed of rotation.

In concert with the control loop, a large slotted disc 40 is mounted between the counterweight 38 and the motor 36 and spins with the rotation of the orbit. An optoelectric slot sensor 46 is clamped over the slotted edge portions of the disc 40 and produces a signal for every passage of slots 42, 44. The optoelectric sensor is mounted on a strip mount 52 which is fixed to a U-shaped support bracket 50, connected between two stationary support stands 54 and 56.

As better seen in FIGS. 2, 3 and 4, the support for the weight of the tray is provided by a generally rectangular frame which is supported at its corners by support stands 54, 56, 58, and 60, which are fixedly secured to the base 12. The frame comprises four generally channel shaped elements 61, 62, 74 and 78 assembled in a rectangular box around the support stands 54, 56, 58 and 60. The backing plate 15 is suspended on this frame by means of four flexible connections which couple the frame to a backing-plate hanger 72 and backing-plate hanger 80 extending substantially parallel and longitudinally across opposite ends of the backing-plate 15. The hangers 72, 80 are additionally generally channel shaped in cross section and include a mounting means 71 with a slot opening to a narrow neck which is adapted to retain a bead. Coupling the backing-plate supports 74 and 78 to the backing-plate hangers 72 and 80 are flexible links 68 and 70, respectively.

Figure 6:
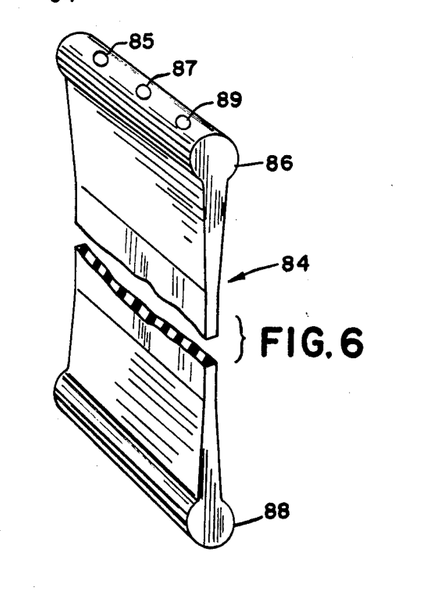
FIG. 6 is a diagrammatic perspective view of a flexible link used in suspending the various portions of the orbital shaker illustrated in FIG. 1.

The flexible link 84, illustrated in FIG. 6, is relatively rectangular with generally circular beads 86 and 88 on each end. The beads 86, 88 taper into a slimmer flexible portion which connects the two ends of a link. The beads can be slid into the mounting members, for example 71 and 73, to provide a connection to the hangers. Likewise, the opposite bead can be slid into identical mounting means in the supports 74, 76 to provide an interlocking of the flexible member 68, 70 therein. Projections 85, 87 and 89 can be provided on the link 84 to ensure a interference fit in the mounting slots so the ends of the links do not move. It is seen, therefore, that the support plate 15 and thus, the tray 14, is constrained to move only in the Y direction, as pictured in FIG. 4, with respect to the support frame.

In a similar manner, the support frame is suspended from the anchored stands 54, 56, 58 and 60. As better viewed in FIGS. 2 and 3, the stands 56 and 58 provide support for hanger elements 60 and 62, respectively. The coupling between the stands and the hanger elements are provided by flexible links 64 and 66 similarly constructed to that previously described for the flexible link 84 shown in FIG. 6. The beads of the flexible links slide into the mounting means of the stands and hangers to provide fixed end points between which the links can flex. Therefore, the inner frame is constrained to move in only one direction, referenced as X in FIG. 3.

To assist in the assembly of the apparatus, the stands 54, 56, 58 and 60; the frame members 61, 62, 74 and 78; and the backing-plate hangers 72 and 80 are all of similar cross section. Preferably, an aluminum extrusion process is used for forming the cross section and the various widths for the channel shaped members are all cut from a run of the extrusion. The cross section illustrated for each element, for example, hanger 80, has a laterally extending foot 81 and a laterally extending arm 83. On the end of each arm is the slot used for gripping the beads of a flexible link. It is noted that adjacent channel members 78, 80, which are connected by a flexible link 70 are inverted to each other such that the arms oppose each other and the slots line up. In addition, various channels such as those shown at 73, 75 and 77 may be formed in the cross sections of the channel shaped members to provide anchors for the screws, for example, 91, 93, which hold the pieces of the frame together.

Figure 5:
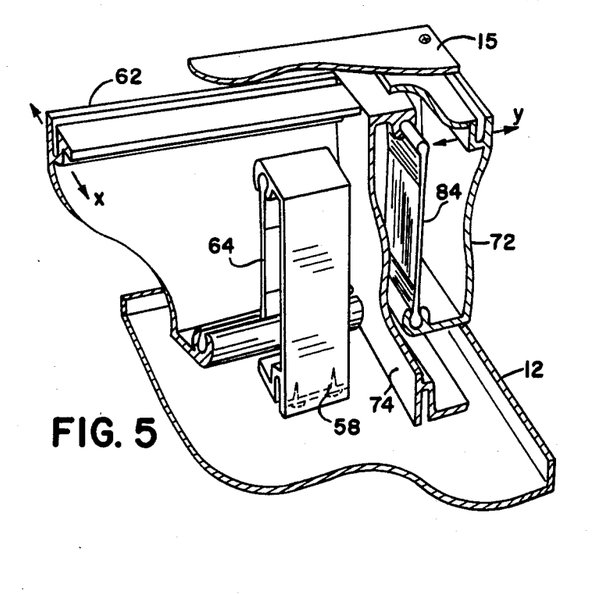
FIG. 5 is a fragmented perspective view of one corner of the suspension system of the orbital shaker illustrated in FIG. 1.

A composite view of one corner of the suspension system of the tray 14 is illustrated in FIG. 5. The corner that was chosen is the stand referenced 58 but the other corners which have stands 54, 56 and 60 are similarly constructed. It is evident that the frame is constrained to move only in the X direction while the backing plate 15 is constrained to move only in the other direction Y. However, the constraint of movement of the backing plate in the Y direction is relative to the movement of the frame which has X motion. Therefore, force on the backing plate caused by the orbital motion of the drive pin 34 causes movement not only of the backing plate 15 but also of the frame and, in a combination of the two translational motions, a smooth circular motion for the tray 14.

The links are preferably comprised of a flexible plastic material for example that manufactured by the DuPont Corp. under the trademark DELRIN 500. It is noted that the link is thicker at the bead and tapers to a thinner central portion that connects the two beads. This provides for uniform flexibility along the length of the link. The substantial width of each link helps resist torsional or twisting force components and maintains the one dimensional movement constraint for each link. This material can be injection molded from a lateral edge so that the molecules of the material line up along the lines of flexure. This produces a link which is capable of bending without failure for an extended lifetime.

The material is advantageously used in this particular instance because it will not stretch under the tension of the loading designed for the tray 14 and importantly does not make any noise during movement while flexing. A very quiet, long lasting suspension link is thereby provided. It should be evident, however, that other materials can be used, both plastics and non-plastics, for the links which suspend the tray. Further, links which pivot about the suspension points can be used but are not as judicious as the present implementation where the links flex along their length because of a lack of wear and noiseless movement.

Figure 7:
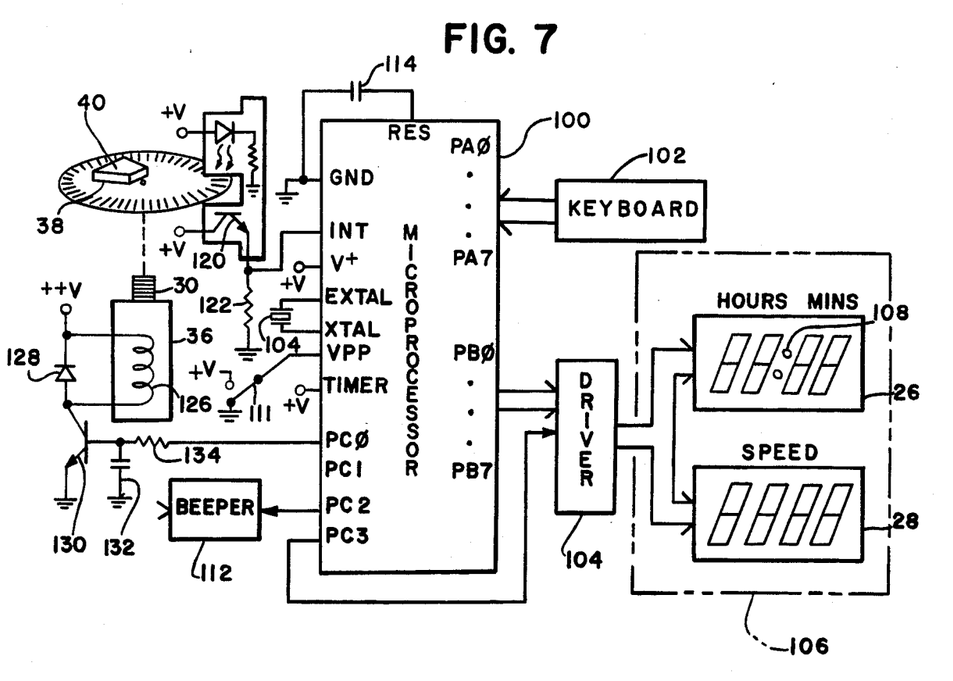
FIG. 7 is an electrical schematic diagram of the microprocessor based control for the orbital shaker illustrated in FIG. 1.

In FIG. 3 there is shown an electronic schematic diagram illustrating a microprocessor based controller for the orbital shaker apparatus. A microprocessor 100 receives the keyboard inputs via its port A lines PA0--PA7. The operator by pressing keys on the keyboard 102 thereby inputs commands and information for the different functions of the system. The microprocessor through port B lines, PB0-PB7, and a port C line, PC3, communicates with the display means 102 via a driver circuit 104. The driver circuit 104 controls the specific elements of the seven segment displays which are lit up relative to the data that is transmitted. The driver circuit 104 controls both the time display 26 and the speed display 28.

Figure 11:
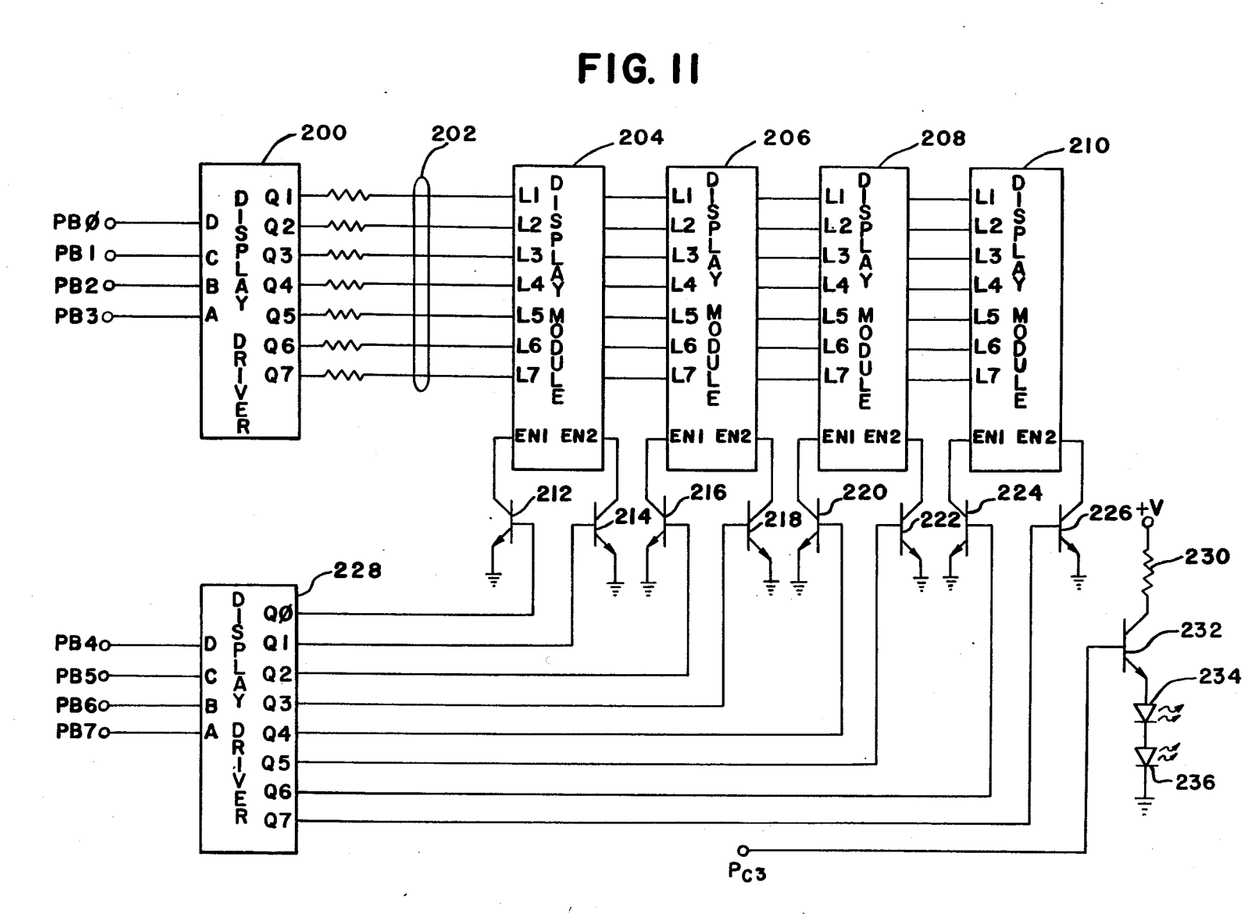
FIG. 11 is a detailed electrical schematic diagram of circuitry comprising the display illustrated in FIG. 7.

The display means 106 will now be more fully explained with reference to FIG. 11, which shows a detailed electrical schematic of the device. It is seen that the display comprises a first display driver 200 and a second display driver 228. The two drivers are connected to four display modules 204, 206, 208 and 210 each containing two, seven segment, LED digits. The display driver 200 has inputs A-D which connect to port B lines, PB0-PB3, and are decoded into outputs Q0-Q6. These outputs form the signals over a common bus 202 to the inputs L1-L7 of the display modules 204, 206, 208 and 210. The decoded signals on the common bus 202 indicate which segments in the display digit is to be visible.

The display driver 228 is similar to that described for display driver 200 and includes inputs A-D connected port B lines, PB4-PB7. The digital input from these lines is decoded into outputs Q0-Q7 which are then transmitted to the bases of transistors 212-226, respectively. Each transistor 212-226 is an NPN transistor with its collector connected to an enable input of a display module and its emitter connected to ground. Each display module has two such enable inputs EN1, EN2 for selecting the particular digit that the line inputs L1-L7 will energize. For example, a high level output from the Q0 output of the display driver 228 causes the transistor 212 to ground the EN1 input of display module 204 and energize the first digit of that module according to the data on common bus 202. A high level logic signal on the Q1 output of the display driver 228 will cause a similar action by transistor 214 at the EN2 input of the display module 204. Thus, the second digit of the display module 204 will display the digital data on the common line 202. In this manner, data can be transferred to any one of the eight LED digits forming the time and the speed data displays.

A PNP transistor 232 is connected by its collector to a source of positive voltage +V through a resistor 230 and by its emitter to ground through two LED devices 234 and 236. The LED 26 devices 234 and 236 form the colon in the time display for separating the hours/minutes digits from the minutes/seconds digits. The colon is lighted by a high level logic signal from the port C line, PC3, which is communicated to the base of the transistor 232 to produce conduction through the diodes 234 and 236.

Another basic function of the microprocessor is to provide a closed loop control for the orbital speed of the tray. It accomplishes this function by providing a logic level motor control signal from the C port line, PC0. This motor control signal is transmitted through a filter, comprising a resistor 134 and a capacitor 132, to the base of a drive transistor 130. The drive transistor 130 is an NPN power transistor having its collector tied to one terminal of the motor coil 126 and its emitter terminal connected to ground. The other terminal of the motor coil 126 is connected to a source of drive voltage ++V. A diode 128 is paralleled with the motor coil 126 such that when the transistor 130 switches on and off the inductive kick pulse will be dissipated in the diode.

The microprocessor produces a square wave output on the control line PC0 which is amplified by the power transistor 130 to switch the motor coil 126 either fully on or fully off. This type of on/off control, typically termed a "bang-bang" type of speed control causes the motor to accelerate at a maximum rate provided by the voltage ++V when the transistor 130 is on and to freewheel and decelerate when the transistor is off. The filter comprising resistor 134 and capacitor 132 rounds the edges of the square wave to provide a smooth transition between the switching levels. The control signal is switched on in response to a state of the motor being below the desired velocity and is switched off in response to the motor being in excess of the desired velocity.

The actual velocity of the motor is determined by the microprocessor through the input of a signal to its INT terminal or interrupt facility. The signal is generated by the optoelectric sensor 46 which senses the discontinuities in the slotted disc 40 to provide the interrupt signal. The optoelectric sensor includes a IR emitting diode (IRD) 116 which is connected between a source of positive voltage +V and ground via a resistor 118. The optoelectric sensor 46 further includes a phototransistor 120 mounted on the other side of the disk 40. Normally, the emission of IRD 116 is blocked by the disk 40 from the photo-receptive base area of the phototransistor 120. The phototransistor 120 is of the NPN type and is connected by its collector to a source of positive voltage +V and by its emitter to ground through a resistor 122. When a slot in the disc 40 appears between the channel between the IRD and phototransistor 120, the transistor receives emissive radiation from the IRD 116 and begins to conduct current. This conduction will produce a voltage on resistor 122 which is interpreted as an interrupt by the microprocessor 100. The microprocessor 100 by determining the time between the interrupt pulses can thereby calculate the actual velocity of the motor.

The microprocessor also controls a beeper 112 with an on/off logic level signal generated by the port C control line, PC2. The beeper 112 is used for alerting various conditions as an audio feedback upon hitting any of the keys, and for an indication of the end of a cycle. The microprocessor 100 contains a programmable read only memory which can be programmed with a programming terminal Vpp which is connectable by a switch 111 to either ground or a source of voltage +V. The programming pin Vpp provides a means for entering the program which the microprocessor 100 executes. A microprocessor of the type shown is commercially available from the Motorola Corp. of Schaumburg, Ill. as Model No. MC68705P3 or MC6805P3.

Figure 8:
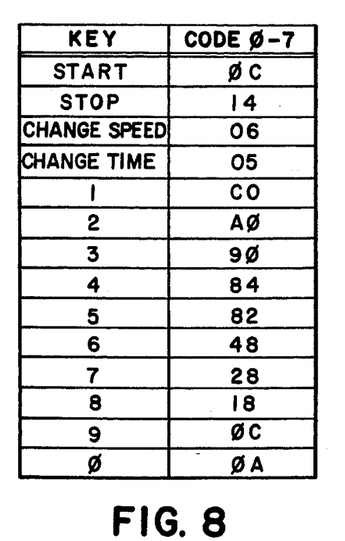
FIG. 8 is a foreshortened pictorial representation of the digital code which is produced by the keyboard and control keys illustrated in FIG. 7.
Figure 9:
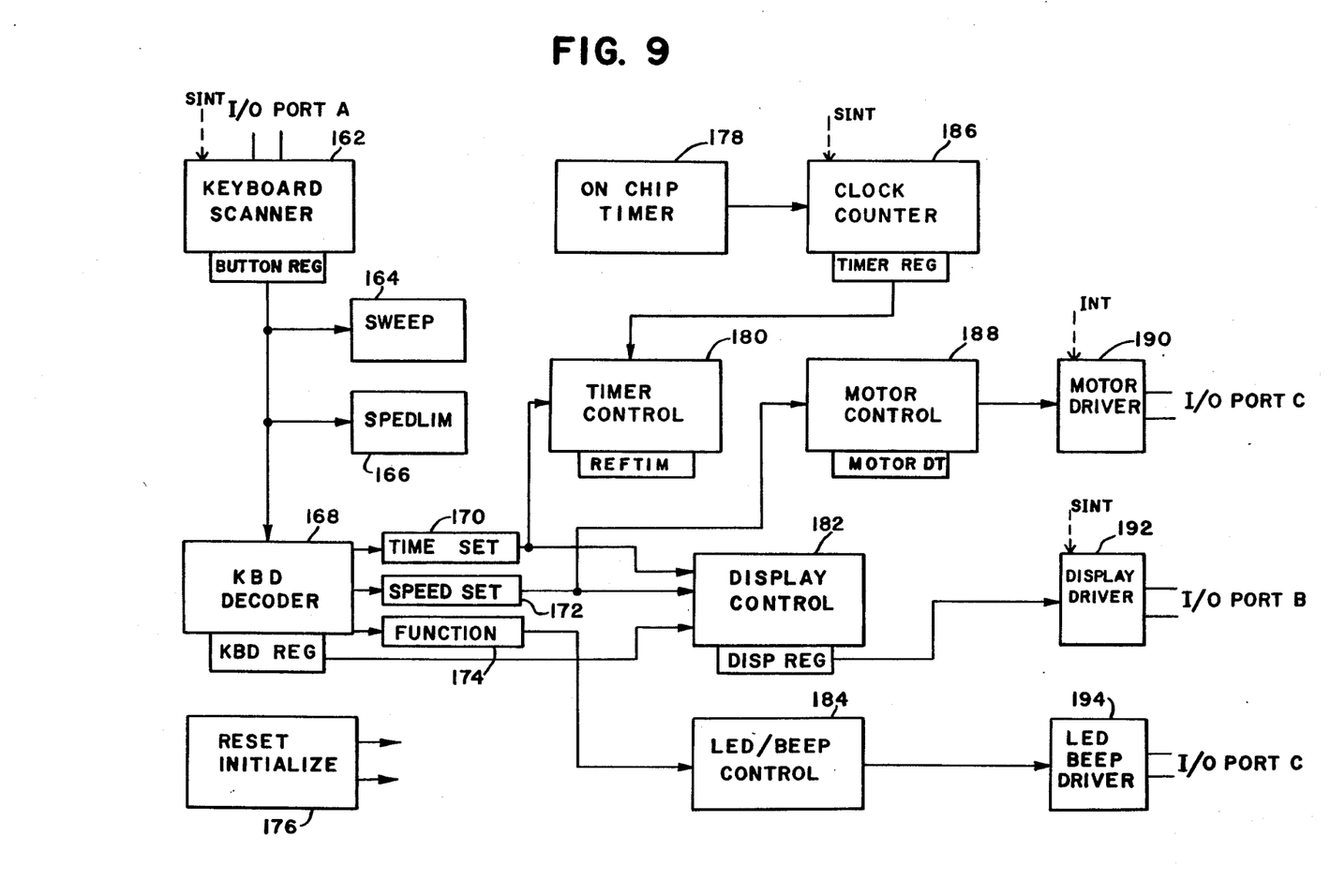
FIG. 9 is a system block diagram of the various routines executed by the microprocessor to control the orbital shaker illustrated in FIG. 1.

A block diagram of the program which runs the microprocessor system 100 is more fully disclosed in FIG. 9 where a keyboard scanner subroutine 162 receives digital data from the port A inputs PA0–PA7 and transfers this information to a keyboard decoder routine 168. A button register of the keyboard scanner routine 162 is used to intermediately store the codes coming in from the keyboard. Each keyboard key has a separate 8-bit code as is illustrated in FIG. 8.

After the bit combinations are decoded by keyboard decoder 168, they are stored in a keyboard register and used to pass variables to a time set routine 170, a speed set routine 172, and a function routine 174. The time set routine 170 receives numerical data from the keyboard through the keyboard scanner routine 162 and the keyboard decoder routine 168 to determine that the operator has pressed the changed time key and the numerical value for the time that he wishes to input for a test. This time value is passed to a display control routine 182 and to a timer control routine 180. The display control routine 182 through a display register will use the time set to control a display driver routine 192 which produces a display of the time period for a particular test in the seven segment displays through port B. Further, the time period is transferred to the timer control routine 180 so that the routine can be used with the combination of a real time clock 186 to determine precisely the amount of time that a certain test should be run.

The speed set routine 172 receives numeric information from the keyboard through the keyboard scanner routine 162 and the keyboard decoder routine 168 in order to read in a speed value for the angular velocity of the shaker during a test. The routine transfers this information to the display control routine 182 which, through the display register, drives the seven segment LED displays via port B to set this number into the speed display. The speed set routine is responsive to the control key change-speed and the numerical sequence which follows it.

A function routine 174 receives input through the keyboard scanner 162 and keyboard decoder routine 168 and functions as a test and default routine. If there are numeric sequences which the time set and speed set routines do not recognize, values which are out of bounds for the apparatus, or inputs other than those the function routine 174 accepts, default and error flags will be generated. In response to these default and error conditions, the function routine drives a LED/BEEP control routine 184. This control routine produces variables which can be used to drive the LED/BEEP driver 194 through port C. When errors or faults occur the beeper 112 can be driven by the LED/BEEP control routine to alert the operator of the condition. Further, for defaults of invalid operational values, the displays are made to flash with the LED/BEEP control routine 184.

The start and stop button keys cause the keyboard scanner and the keyboard decoder routines 162, 168 to produce a zero time set and a zero speed set, in the case of the stop button, and to start the timer control and motor control, in case of the start button. A reset and initialize routine 176 is used once only during power up to produce an initialization of the variables used and start the other programs, and to produce a definition of particular constants and registers.

A on chip hardware timer 178 on the microprocessor chip 100 produces pulses at a predetermined clock rate which can be sensed by clock counter routine 186 to maintain a real time clock. The real time clock can produce a reference time for the starting point of a count down for a particular test period by transfer of that reference time to a timer control routine 180. Further, the timer control 180 can interrogate the time set routine 170 for the duration of a particular test. In response to the start button, the timer control routine 180, thereafter counts down the test duration and when there is a time out transfers this information to the motor control 188.

The motor control routine 188 by determining when a timeout occurs, can discontinue the test operation. The motor control routine also receives the speed set information and interrupt information from an interrupt routine 196 to provide a variable indicative of the actual speed of the motor. Based on these variables, the motor control produces information which can be transferred to a motor driver routine 190 which controls the operational state of the, motor through port C.

Illustrate in the following appendix A is the listing of the main monitor loop which calls the routines shown in FIG. 9. Lines 0598–0613 are the instructions forming the reset and initialize routine 176. It is seen that subroutines RCLKSPD, RCLKCNT, RDISDRV, RKEYSCN and RKBDDEC are called in order during the start up or upon the reset of the system. RCLKSPD resets the cockspeed of the on chip timer 178; RCLKCNT resets the timer register in the clock counter routine 186; RDISDRV resets the display driver routine 192; RKEYSCN resets the keyboard scanner routine 162, and RKBDDEC resets the keyboard decoder routine 168. After the control routines have been reset, the main monitor enables the interrupt at line 0613 and then enters a monitor loop which will be constantly executing while the program is running.

The main loop consists of calling the nine listed subroutines at lines 0614–062C. First KBDDEC, the keyboard decoder routine 168, is called. Thereafter, DISPCON and TIMCON, the display control routine 182 and the timer control routine 180, respectively, are called. In succession, SWEEP, the acceleration and deceleration routine 164; AUTOSTP, the automatic stop routine; and MOTOR, the motor control routine 188 are called. This group comprises the main control routines for the keyboard input, motor control, and display control. Next in the main loop BEEP, the LED driver and BEEP control routine 184 is called. CLKSPED, the clock speed set routine is called next, and is followed by COLON to light the diodes between the time digits. This is the basic program loop which receives and generates the necessary information for running the system.

In addition to the main loop, the program has a group of routines which are executed on a timed basis. The microprocessor has provisions for setting a software interrupt SINT which transfers control of the program from the main loop to the interrupt handling routine TIMINTR at line 0631. It is here that the routine CLKCNT, the clock counter routine 186; KEYSCN, the keyword scanner routine 162; and DISDRV, the display driver routine 192 are called periodically. In the present system, the software interrupt is generated every 250 millisec and thus each routine of this group is called approximately four times per second.

The hardware interrupt, which takes precedence over the software interrupt, calls the motor driver routine 190 to control the speed of the apparatus. After execution of the motor driver, the microprocessor will either return to the main monitor loop or service the software interrupt if it is waiting.

Therefore, the execution sequence of the program is once through the initializing routine upon startup or reset and then to the main monitor routine for constant execution. The execution of the monitor routines are interrupted by the software interrupt every 250 millisecs and by the hardware interrupt at a time depending upon the speed of the motor. After the interrupts have been serviced the program returns to the execution of the main monitor.

Figure 12:
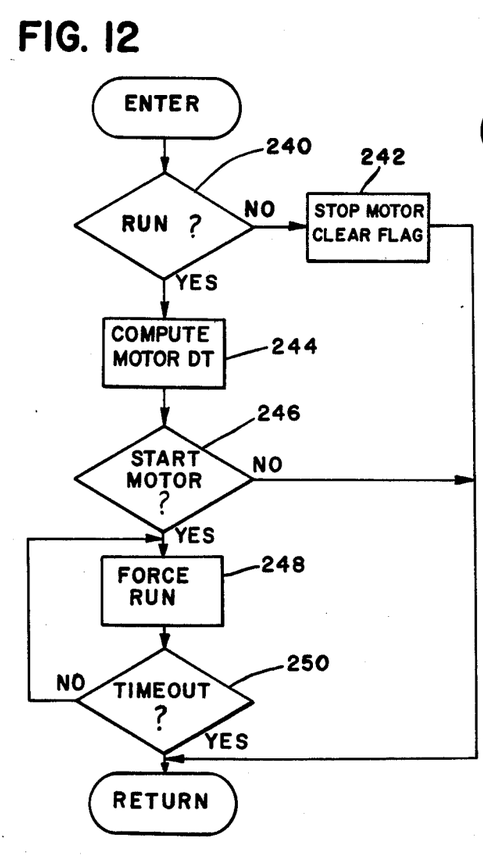
FIG. 12 is a detailed flow chart of the motor control routine illustrated in FIG. 9.
Figure 13:
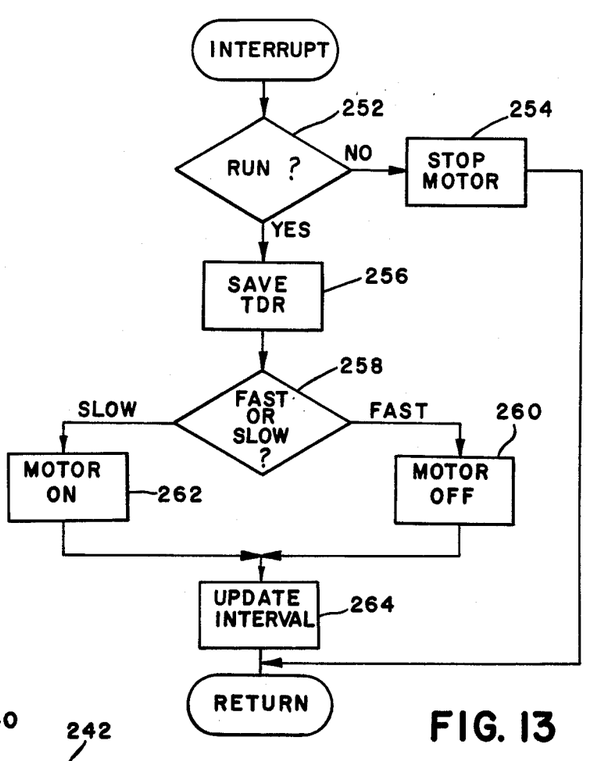
FIG. 13 is a detailed flow chart of the motor driven routine illustrated in FIG. 9.

FIGS. 12 and 13 illustrate detailed flow charts for the motor control routine 188 and motor driver routine 190, respectively. The program listings for these programs are found on pages 22 and 23, respectively. Initially, in FIG. 12, the motor control routine 180 reads the location in memory where a run flag has been stored in block 240. If the run flag is set, then the program will branch to block 244. If the run flag has not been set, the motor will be stopped by functional block 242 and the run flag cleared. Thereafter, the program will return to the processing of input data from the keyboard and its main loop monitor functions. When a run flag is detected, the number of clock counts for the speed set point of the motor will be computed in block 244. Next, the program will determine whether the motor is to be started at this time by interrogating a location in memory which indicates whether this is the first time through the program. If not, the program returns, but otherwise, if all conditions are ready for the motor to be started, the motor is forced to run for a short period in block 248. Decisional block 250 will determine if there has been a timeout. A timeout will cause the motor control routine to terminate return control to the main monitor routine.

The motor driver routine 190 begins in block 252 and is essentially a speed control loop called by the hardware interrupt produced from the optoelectric sensor. The first block determines whether the run flag is set and, if not, the motor is stopped in block 254 and the program returns to the monitor routine. If the run flag is set, then in block 256 the program reads the real time clock as an indication of the clock counts since the last interrupt. This time is stored in the variable TDR. In block 258, the actual speed is compared to the set speed to determine whether the motor is operating either too fast or too slow. If the motor is operating slowly, the program will branch to block 262 where the motor control signal is set to a level logic which will turn the motor fully on. In the alternative, if the motor is already going faster than the set point, then the control signal is turned off by block 260.

After the control signal has either been set on or off, the separate branches of the program consolidate at block 264 where the reference for the selected velocity variable is updated. The variable is updated from tne motor control routine by adding the time period Td. The program then returns to the location in the monitor routine where the microprocessor was executing prior to the interrupt after performing its control and updating functions. The loop process continues until the predetermined period has elapsed as previously indicated.

To visualize the manner in which the microprocessor makes the decision whether to turn the motor control signal to a on signal level or to an off signal level consider that the selected or set point speed can be converted into a desired time interval Td based upon the microprocessor clock rate and the slot densities of the disk 40. First calculate a constant K which is the number of clock counts between the slots of the disk at 1 RPM.

$$K = \frac{Nc \times 60 \text{ sec}/1 \text{ min}}{N}$$

where
Nc = the microprocessor clock rate—for example 65,536 Hz.
N = number of slots on the disk—for example 180 for a disk with 2° slot increments.
K = 21,845 counts Now for any selected speed V(SEL) in RPMs, the desired time interval Td, expressed as the number of clock counts between two slots is $$Td = \frac{K}{V(SEL)} \text{ RPM}$$

For a speed range of 40 to 240 RPMs, Td becomes
Td(40) = 546 counts
Td(240) = 91 counts
Upon receiving a change speed command, the set speed entered is converted into the variable Td and stored.

The microprocessor 100 when it receives an interrupt begins a counter clocked at the 65,536 Hz. frequency. When the next interrupt pulse appears, the microprocessor stores the clock count Tf for use as the actual speed. Now the variable X is calculated as $$Tf - Td = X$$

if X > 0 then turn the motor off
if X < 0 then turn the motor on

The controller uses the interval comparison as a convenient and accurate method of controlling the speed of the motor. Since the interrupts occur every 2° of rotation for the motor, the actual speed is calculated 180 times per revolution providing an extremely accurate comparison standard. The program loop for the actual control is additionally executed quickly and permits many control iterations per revolution. The loop is executed in its simplest form by reading two constants, one from the timer register for the actual speed of the motor and the other from memory for the set speed of the motor and then doing the comparison and test steps. The tests and output control signal commands can be accomplished in the same instructions.

In the preferred implementation of the speed. control as seen in the motor driver routine listing in appendix A this method is combined with a means to compensate for the cycles that the speed control is under or over the actual set speed. In this manner the system actually maintains a tight speed control while providing compensation to ensure the total number of cycles for the predetermined time period are correct. At line 05C3 the value of the real time clock, TDR, is save to memory location SAVETDR. This value is compared to a reference time variable REFTIML, REFTIMH at lines 05CB-0501 to determine which is greater than the other. The motor control signal is set, as discussed previously, based upon the comparison. Thereafter, the number of clock pulses which should be seen at the selected speed between two interrupts is added to the reference time variable. Thus, for every cycle through the routine the reference time variable is incremental by an incremental clock count MTRDT based on what should be the correct number at the selected speed. This total number should equal the real time clock number TDR if the speed is that desired. If the motor is slow and cycles are being lost then the motor is speeded up until both are equal. If the motor is fast and cycles are being added then the motor is slowed down until both are equal. A speed control in combination with a cycle equalization method has thus been disclosed.

Figure 10:
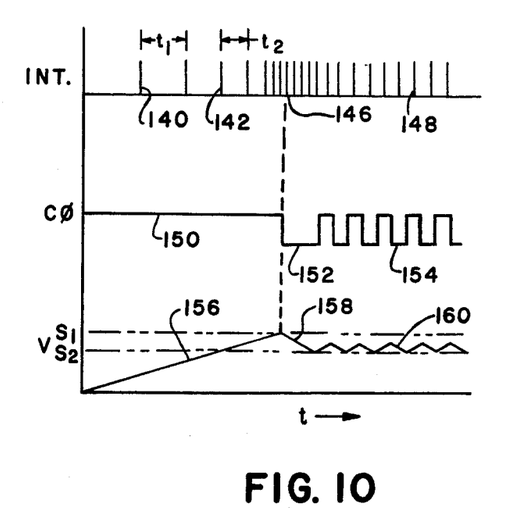
FIG. 10 is a series of waveform diagrams illustrating the operation of the speed control loop for the shaker apparatus illustrated in FIG. 1.

Waveform diagrams for a control operated in this manner are illustrated in FIG. 10 where the interrupt pulses from the optoelectric sensor are illustrated as the waveform INT. The motor control signal, output to the drive transistor 130 (FIG. 7), is shown as the waveform labelled CO. The velocity profile for the motor speed as a function of time is shown in the waveform labelled V where speed set point S1 and speed set point S2 will be used to explain operation of the control.

At the start of an interval, the operator has previously input a time duration over which the agitation will occur. As further input, a speed is set at which he desires the test or agitation to occur, in the example S1, initially. The operator presses the start button and the control thereafter will bring the shaker up to the set point speed and maintain it at that speed precisely for the duration of the interval. The motor starts at rest and therefore the control signal CO is set to a high level indicating that the motor is running slower than the set point velocity. This function is provided by the motor control routine forcing tne interrupts to occur at a motor start so that the motor drive routine can take control.

In response to the high level of the CO signal labelled 150, the velocity will begin to ramp at a particular rate shown by the slope of the velocity level 156. As time passes, this velocity level will approach the set point S1 and finally exceed it. When the control senses that the actual velocity has exceeded S1, then the control signal CO is set to a low logic level as illustrated at 152. Turning off the drive signal to the motor causes it to freewheel and the velocity to fall at a characteristic slope as shown by 158.

Let us assume at the point which the velocity V exceeds S1, that the set point is changed to S2. The velocity V will therefore, decrease until the motor has slowed to a value below S2 at which time the control signal CO will again be set to a high logic level. Thereafter, the actual velocity exceeds or slows below or above the set point S2, the control signal will oscillate in the opposite manner to provide a limit cycle based upon the two slopes 156 and 158 as shown in 160, FIG. 10. Essentially, the control voltage CO will then become a square wave of a particular frequency dependent upon the time lags in the control loop.

It is seen that the interrupt signal INT provides a method for determining when the actual velocity V crosses the set point. During the initial acceleration part of the speed cycle (slope 156) the INT pulses begin to come at a higher frequency where two successive pulses 140 and 142 are closer together than the previous two successive pulses. It is seen that at the highest velocity the pulses are the closest together at 144. The pulses then begin to spread out and lower in frequency as the motor slows because of the low logic level on the signal line CO as seen at 146 which corresponds to slope 158. Thereafter, when the controller reaches a limit cycle at 160 the corresponding interrupt pulses at 148 are relatively equal in spacing.

This type of controller is termed a "bang-bang" type control where the slope 158 for deceleration is substantially different than the slope for acceleration. This is caused by the manner in which the motor is controlled by the control signal CO and the configuration of the motor including the counterweight. The acceleration slope is determined by the full on drive produced by the control when the motor speed is less than the set point. The motor speed then coasts down when the drive is turned at a rate determined by the flywheel effect of the counterweight. This produces an advantageous control which may precisely maintain the speed of the rotation for the specimen tray 14 within ±1% of set point over a range of between 40 and 250 RPMs.

While a preferred embodiment of the invention has been illustrated, it will be obvious to those skilled in the art that various modifications and changes may be made thereto without departing from the spirit and scope of the invention as defined in the appended claims.

```
0599   INITAL     LDAI $FF
0600              STAD PCDDR
0602              JSRE RCLKSPD
0604              JSRE RCLKCNT
0607              JSRE RDISDRV
060A              JSRE RKEYSCN
060D              JSRE RKBDDEC
0610              CLI              ENABLE
                                   INTERRUPT
0613              BSETO FUNREQ     BEEP
0614   LOOP       JSRE KBDDEC
0617              JSRE DISPCON
061A   ON         JSRE TIMCON
061D              JSRE SWEEP
0620              JSRE AUTOSTP
0623              JSRE MOTOR
0626              JSRE BEEP
0629              JSRE CCKSPED
062C              JSRE COLON
062F              BRA              @LOOP
0631   TIMINTR    JSRE CLKCNT
0634              JSRE KEYSCN
0637              JSRE DISDRV
063A              RTI
063B   RCLKCNT    EQU $4EO
063B   CLKCNTH    EQU $4E7
063B   RDISDRV    EQU $470
063B   DISDRV     EQU $479
063B   RKEYSCN    EQU $237
063B   KEYSCN     EQU $242
063B   RKBDDEC    EQU $270
063B   KBDDEC     EQU $270
063B   DISPCON    EQU $430
063B   TIMCON     EQU $500
063B   SWEEP      EQU $540
063B   AUTOSTP    EQU $400
063B   MOTOR      EQU $580
063B   BEEP       EQU $1AB
063B   COLON      EQU $200
063B   RCLKSPD    EQU IDO
063B   CLKSPED    EQU ID5
05CO   MTRDRV     LDAD TDR         SAVE TDR
05C2              COMA
05C3              STAD SAVETDR
05C5   RUNCHK     LDAD FUNREG
05C7              AND              I $80
05C9              BEQ              @OFF
05CB   COMPUTE    LDAD REFTIML     FIND
05CD              SUBD SAVETDR     ERROR
05CF              LDAD REFTIMH
05D1              SBCD TIMERL
05D3              BPL              @OFF
05D5   ON         BSETO PCDATA     SPEEDUP
05D7              BRA              @UPDATE
05D9   OFF        BCLRO PCDATA     SLOWDOWN
05DB   UPDATE     LOAD SAVETDR
05DD              ADDD MTRDTL
```

-continued

| | | | |
|---|---|---|---|
| 05DF | | STAD REFTIML | |
| 05E1 | | LDAD TIMERL | |
| 05E3 | | ADCD MTRDTH | |
| 05E5 | | STAD REFTIMH | |
| 05E7 | | RTI | |
| 05E8 | FUNREG | EQU $23 | |
| 05E8 | TIMERL | EQU $2B | |
| 05E8 | SAVETDR | EQU $30 | |
| 05E8 | REFTIMH | EQU $31 | |
| 05E8 | REFTIMH | EQU $32 | |
| 05E8 | MTRTDH | EQU $33 | |
| 05E8 | MTRTDH | EQU $34 | |
| 0578 | MOTOR | LDAD FUNREG | RUN? |
| 0580 | | ANDI $80 | |
| 0582 | | BEQ | @STOP |
| 0584 | | LDAD SPEDSET | |
| 0586 | | BEQ | @STOP |
| 0588 | COMPUTE | STAD MD | |
| 058A | | LDXI HIFACTR | |
| 058C | | LDAI LOFACTR | |
| 058E | | JSRE DIV | |
| 0591 | | CLRX | TIMES 4 |
| 0592 | | LSLA | |
| 0593 | | ROLX | |
| 0594 | | LSLA | |
| 0595 | | ROLX | |
| 0596 | | STAD MTRDTL | |
| 0598 | | STAD MTRDTH | |
| 059A | START | TSTD FLAG | |
| 059C | | BNE | @EXIT |
| 059E | | INCD FLAG | |
| 05A0 | | LDAD TIMERLO | |
| 05A2 | | ADDI $40 | START DELAY |
| 05A4 | LOOP | BSET0 PCDATA | |
| 05A6 | | CMPD TIMERLO | |
| 05A8 | | BNE | @LOOP |
| 05AA | | RTS | |
| 05AB | STOP | BCLR0 PCDATA | |
| 05AD | | CLRD FLAG | |
| 05AF | EXIT | RTS | |
| 05B0 | FUNREG | EQU $23 | |
| 05B0 | SPEDSET | EQU $29 | |
| 05B0 | TIMERLO | EQU $2B | |
| 05B0 | MTRDTH | EQU $33 | |
| 05B0 | MTRDTL | EQU $34 | |
| 05B0 | FLAG | EQU $35 | |
| 05B0 | DIV | EQU $95 | |
| 05B0 | MD | EQU $10 | |
| 05B0 | HIFACTR | EQU $15 | |
| 05B0 | LOFACTR | EQU $55 | |
| 0540 | SWEEP | LOAD FUNREG | RUN |
| 0542 | | ANDI $80 | |
| 0544 | | BEQ | @DONE |
| 0546 | | LOAD TIMERLO | TIMEOUT? |
| 0548 | | SUBD TREF | |
| 054A | | ANDI $FC | |
| 054C | | BNE | @DONE |
| 054E | | LOAD TIMERLO | UPDATE |
| 0550 | | ADDI $08 | |
| 0552 | | STAD TREF | |
| 0554 | UPCHK | LOAD BUTTON | |
| 0556 | | CMPI UPCODE | |
| 0558 | | BNE | @DWNCHK |
| 055A | | LDAI $F0 | 240? |
| 055C | | CMPD SPEDSET | |
| 055E | | BEQ | @DONE |
| 0560 | | INCD SPEDSET | |
| 0562 | | RTS | |
| 0563 | DWNCHK | CMPI DWNCODE | |
| 0565 | | BNE | @DONE |
| 0567 | | LDAI $28 | 40? |
| 0569 | | CMPD SPEDSET | |
| 056B | | BEQ | @DONE |
| 056D | | DECD SPEDSET | |
| 056F | DONE | RTS | |
| 0570 | BUTTON | EQU $22 | |
| 0570 | FUNREG | EQU $23 | |
| 0570 | SPEDSET | EQU $29 | |
| 0570 | TIMERLO | EQU $2B | |
| 0570 | TREF | EQU $36 | |

-continued

| 0570 | UPCODE | EQU $A5 | C-SPEED&2 |

What is claimed is:

1. Apparatus for imparting cyclical motion to articles, comprising:
   a base;
   a tray for supporting the articles and movable relative to said base;
   drive means for effecting a predetermined cyclical motion of said tray; and
   suspension means for supporting said tray on said base and for providing two-axis translational movement of said tray while preventing rotation thereof, said suspension means including a plurality of flexible supports loaded in tension and substantially inflexible in predetermined directions.

2. Apparatus in accordance with claim 1 wherein: each of said flexible supports comprises a generally rectangular strip of flexible material of substantially greater width than thickness so as to be substantially inflexible about axes not parallel to said strip.

3. Apparatus in accordance with claim 2 wherein said suspension means further includes
   a relatively rigid frame and a plurality of stands extending upwardly from said base, said frame being suspended from said stands by a plurality of said flexible supports to restrict said frame to move only in substantially rectilinear motion in a first predetermined direction relative to said base;
   said tray being suspended from said frame by a plurality of said flexible supports to restrict said tray to move only in substantially rectilinear motion in a second predetermined direction relative to said frame.

4. Apparatus in accordance with claim 3 wherein said first predetermined direction is perpendicular to said second predetermined direction.

5. Apparatus in accordance with claim 4 wherein said tray has a pair of generally channel shaped hangers extending along opposite sides thereof and wherein a plurality of said flexible supports extend from said frame to said hangers to support said tray.

6. Apparatus in accordance with claim 5 wherein each of said flexible supports has a bead on each end, and each of said generally channel shaped members, stands and hangers has a channel therein for receiving one or more of said beads.

7. Apparatus in accordance with claim 6 wherein each of said beads has one or more projections thereon to provide an interference fit with its associated channel.

8. Apparatus in accordance with claim 4 wherein said frame comprises a plurality of generally channel shaped members, and wherein said channel shaped members and said stands are all of substantially identical cross section.

9. Apparatus in accordance with claim 7 wherein said drive means comprises means for translating said tray in circular orbital motion.

10. Apparatus in accordance with claim 1 wherein each of said flexible supports comprises a strip of material having non-uniform thickness to distribute stress approximately uniformly along its length.

11. Apparatus in accordance with claim 10 wherein each of said flexible supports is made of plastic.

12. Apparatus for imparting cyclical motion to articles, comprising:
    a base;
    a tray for supporting the articles and movable relative to said base;
    drive means for effecting a predetermined cyclical motion of said tray; and
    suspension means for supporting said tray on said base and for permitting translational orbital movement of said tray while preventing rotation thereof, said suspension means comprising a frame, means for suspending said frame from said base so that said frame is movable relative to said base only in substantially rectilinear motion in a first predetermined direction, and means for suspending said tray from said frame so that said tray is movable relative to said frame only in substantially rectilinear motion in a second predetermined direction.

13. Apparatus in accordance with claim 12 wherein said drive means includes a D.C. motor.

14. Apparatus in accordance with claim 12 wherein said drive means includes a motor which has a vertically oriented drive shaft.

15. Apparatus in accordance with claim 14 wherein said drive means further comprises a crank affixed to said drive shaft and connecting said drive shaft to said tray so that rotation of said drive shaft imparts circular orbital motion to said tray.

16. Apparatus in accordance with claim 15 further comprising a counterweight affixed to said crank to at least partially balance the weight of said tray and the articles supported thereby.

* * * * *

UNITED STATES PATENT AND TRADEMARK OFFICE
CERTIFICATE OF CORRECTION

PATENT NO.   :   4,673,297
DATED        :   June 16, 1987
INVENTOR(S)  :   Siczek et al.

It is certified that error appears in the above-identified patent and that said Letters Patent is hereby corrected as shown below:

Col. 2, Line 6, after "with" delete "a".
Col. 9, Line 39, after "the" delete ",".
Col. 9, Line 40, change "Illustrate" to --Illustrated--.
Col. 12, Line 3, after "speed" delete ".".
Col. 12, Line 50, change "tne" to --the--.
Col. 14, Line 9, change "Tne" to --The--.

Col. 1, Line 58, after "speed" delete "and".
Col. 2, Line 39, after "microprocessor" insert --,--.
Col. 2, Line 40, after "speed" insert --,--.
Col. 2, Line 40, after "output" insert --,--.
Col. 2, Line 46, after "reference" insert --time--.
Col. 2, Line 47, delete "time" (first occurrence).
Col. 5, Line 21, change "a" to --an--.
Col. 7, Line 2, change "energize" to --energizes--.
Col. 7, Line 56, change "a" to --an--.
Col. 9, Line 18, change "A" to --An--.
Col. 9 Line 47, change "cockspeed" to --clock speed--.

Signed and Sealed this

Fifteenth Day of December, 1987

Attest:

DONALD J. QUIGG

*Attesting Officer*          *Commissioner of Patents and Trademarks*